(12) United States Patent
Gao et al.

(10) Patent No.: US 12,393,387 B2
(45) Date of Patent: Aug. 19, 2025

(54) ELECTRONIC DEVICE

(71) Applicant: Lenovo (Beijing) Limited, Beijing (CN)

(72) Inventors: Xiaoju Gao, Beijing (CN); Aiguo Zheng, Beijing (CN); Hao Song, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/530,513

(22) Filed: Dec. 6, 2023

(65) Prior Publication Data

US 2024/0220180 A1   Jul. 4, 2024

(30) Foreign Application Priority Data

Dec. 31, 2022   (CN) .......................... 202211738495.9

(51) Int. Cl.
- *G06F 3/14* (2006.01)
- *G06F 3/02* (2006.01)
- *G06F 3/147* (2006.01)

(52) U.S. Cl.
CPC .............. *G06F 3/1423* (2013.01); *G06F 3/02* (2013.01); *G06F 3/147* (2013.01)

(58) Field of Classification Search
CPC .................................................... G06F 3/1423
See application file for complete search history.

(56) References Cited

U.S. PATENT DOCUMENTS

| | | | | |
|---|---|---|---|---|
| 10,747,264 B1* | 8/2020 | Knoppert et al. | .... | G06F 1/1677 |
| 2009/0009681 A1* | 1/2009 | Iijima | .................... | G06F 1/1683 |
| | | | | 349/58 |
| 2013/0314348 A1* | 11/2013 | Luo | ........................ | G09G 5/003 |
| | | | | 345/173 |
| 2016/0241686 A1* | 8/2016 | Zhang | .................... | H04M 1/026 |
| 2016/0246155 A1* | 8/2016 | Loxley | .................... | G02F 1/195 |
| 2020/0319500 A1* | 10/2020 | Hu | ........................ | G02B 5/136 |
| 2021/0124544 A1* | 4/2021 | Burns | .................... | G06F 1/1679 |
| 2022/0269311 A1* | 8/2022 | Hung | .................... | G06F 1/1679 |

* cited by examiner

*Primary Examiner* — Matthew Yeung
(74) *Attorney, Agent, or Firm* — ANOVA LAW GROUP, PLLC

(57) ABSTRACT

An electronic device including a first body, the first body having a first side and a second side opposite the first sides; a second body, the second body being connected to the first body through a connecting device to change a relative position of the first body and the second body; a first display device disposed on the first side, including a display unit set, the display device being configured to present an image, the display unit set being configured to present three or more colors; and a second display device having a different display principle from the first display device, the second display device being disposed on the second side and including a light-emitting unit and a second display unit set.

14 Claims, 6 Drawing Sheets

ELECTRONIC DEVICE

CROSS-REFERENCES TO RELATED APPLICATION

This application claims priority to Chinese Patent Application No. 202211738495.9 filed on Dec. 31, 2022, the entire content of which is incorporated herein by reference.

FIELD OF TECHNOLOGY

The present disclosure relates to the field of computer technology and, more specifically, to an electronic device.

BACKGROUND

With the continuous development of electronic devices, the types of electronic devices are increasing day by day.

On a daily basis, users may use different types of electronic devices based on different needs, therefore, users need to have multiple types of devices at the same time. In addition, users need to turn on different electronic devices based on different needs, which is inconvenient to the users when using electronic devices.

SUMMARY

One aspect of this disclosure provides an electronic device. The electronic device includes a first body, a second body, a first display device, and a second display device. The first body has a first side and a second side opposite the first sides. The second body is connected to the first body through a connecting device to change a relative position of the first body and the second body. The first display device is disposed on the first side, and the first display device includes a display unit set. The display device is configured to present an image, and the display unit set is configured to present three or more colors. The second display device has a different display principle from the first display device. The second display device is disposed on the second side and includes a light-emitting unit and a second display unit set.

One aspect of this disclosure provides a displaying method. The method includes displaying an image on a first display device disposed on a first side of a first body of an electronic device, rotating the first body relative to the second body to satisfy a relative positional relationship between the first body and the second body, and displaying an image on a second display device disposed on a second side of the first body of the electronic device. The first side is opposite the second side. The electronic device further includes a second body being connected to the first body through a connecting device to change a relative position of the first body and the second body. The first display device includes a first display unit set, the display unit set being configured to present three or more colors. The second display device has a different display principle from the first display device and includes a light-emitting unit and a second display unit set.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Figure 1:
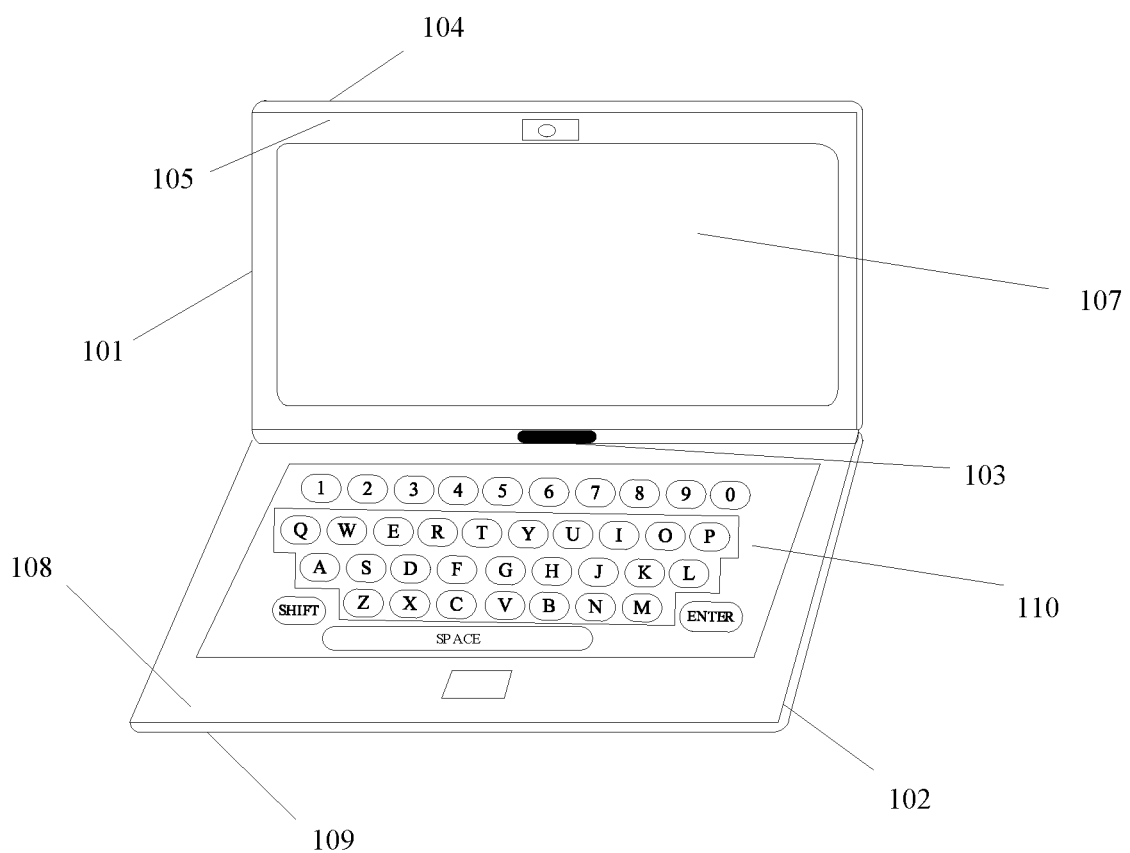
FIG. 1 is a schematic structural diagram of an electronic device according to an embodiment of the present disclosure.

FIG. 1 is a schematic structural diagram of an electronic device according to an embodiment of the present disclosure.

As shown in FIG. 1, the electronic device includes a first body 101 and a second body 102. The second body 102 is connected to the first body 101 through a connecting device 103. The relative position of the first body and the second body may be changed through the connecting device.

The first body and the second body may take different shapes, which is not limited in the embodiments of the present disclosure. In some embodiments, the first body and the second body may be plate-shaped. For example, in FIG. 1, the first body and the second body are both rectangular flat plates with a certain thickness. Of course, FIG. 1 is only an example, and the first body and the second body can also be in other plate-like shapes or other non-plate-like shapes, which is not limited to the embodiments of the present disclosure.

The first body 101 has a first side 104 and a second side 105 opposite to the first side 104. As shown in FIG. 1, the first side and the second side of the first body are parallel and back-to-back sides.

Figure 2:
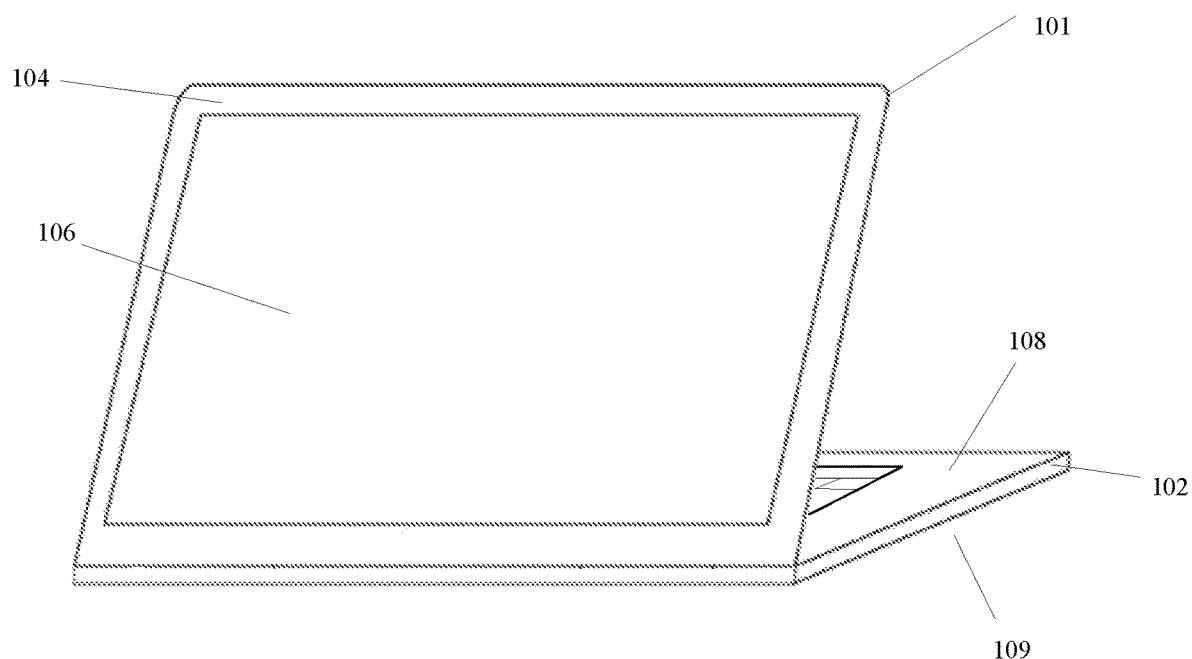
FIG. 2 is a schematic diagram of a mode in which the electronic device is in according to an embodiment of the present disclosure.

A first display device (not shown in FIG. 1) may be provided on the first side 104 of the first body 101. An example of the first display device can be seen in FIG. 2, which is a schematic diagram of the electronic device shown in FIG. 1 in another orientation. As shown in FIG. 2, a first display device 106 is provided on the first side 104 of the first body 101 of the electronic device.

A second display device 107 is arranged on the second side 105 of the first body.

Comparing FIG. 1 and FIG. 2, it can be seen that the first display device and the second display device 1 are respectively arranged on two sides of the first body facing away from each other.

In some embodiments, the first display device may include a first display unit set. The first display device may be used to present a first image, and the first display unit set may present at least three colors. By presenting different combinations of at least three colors in the first display unit set, the first display device can display different images.

In some embodiments, the at least three colors that the first display unit set can present may include black, white, and at least one color other than black and white.

In particular, the first display unit set may present more than three types of colors such that the first display device can support the display of color images. For example, the first display unit set can not only present black, white, and gray, but also can present multiple colors other than black, white, and gray such that the first display device not only support black and white image colors, but also supports the display of color images.

In some embodiments, the first display unit set may be composed of multiple first display units in some form.

The display principle of the second display device may be different from the display principle of the first display device. The second display device may include a light-emitting unit and a second display unit set. The second display device may display images through a second display unit set. The second display unit set may be a set composed of multiple second display units in some form.

There are many possibilities for the second display device.

In some embodiments, the light emitted by the light-emitting unit in the second display device may be collected through the second display unit to present a second image. For example, the second display device may be a liquid crystal display device, the second display unit set may be a liquid crystal module, etc., and the light-emitting unit may be a backlight source.

Of course, there are other possibilities for image presentation in the second display device by means of the light-emitting unit and the second display unit set. For example, the second display device may be a display device using an organic light-emitting display (OLED), and the light-emitting unit may be an organic light-emitting diode or a light-emitting layer in the OLED, and the second display device may be a part of the OLED other than the light-emitting unit.

For distinction between the images presented by the first display device and the second display device, the present disclosure may also refer to the image presented by the first display device as the first image, and the image presented by the second display device as the second image.

It should be understood that in the present disclosure, the display sizes of the first display device and the second display device may be the same or different.

In some embodiments, as shown in FIG. 1, the display sizes of the first display device and the second display device may meet the same condition. The display sizes meeting the same condition may be that the size difference between the display sizes of the first display device and the second display device is less than a set threshold. For example, relative to the display size of the first display device, the size difference between the display size of the second display device and the display size of the first display device may be no more than 20% of the display size of the first display device.

In particular, when the display sizes of the first display device and the second display device meet the same condition, the power consumption of the first display device may be lower than the power consumption of the second display device, and the first display device may consume less power to display images.

Based on the above description, in this embodiment, the electronic device includes a first body and a second body connected through a connecting device. A first display device is provided on the first side of the first body of the electronic device, and a second display device is provided on the second side of the first body. Since the display principles of the first display device and the second display device may be different, different display devices on both sides of the first body may be used to meet users' different usage needs.

In addition, since the display device in the present disclosure can present at least three colors, the image effect presented by the display device can reach the image effect presented by conventional display devices (such as OLED and other display devices), thereby meeting the users' viewing needs.

In the present disclosure, unlike the second display device, the first display device may not have a light-emitting unit, and naturally does not need to use a backlight or the like to illuminate images to human eyes.

In some embodiments, the image presented by the first display device may be perceived by the viewer after being illuminated by light. That is, the image presented by the first display device can rely on the external light reflection of the electronic device to enter the viewer's eyes, instead of relying on the first display device to emit light to project the image into the human eyes, therefore, there is no need to provide a backlight component for the first display device. Since the image presented by the first display device is reflected rather than directly projected into the human eyes, eye damage to the user viewing the first display device can be reduced.

Based on this, the first display device can have a variety of possible forms, as long as the display device can support at least three colors, and the image presented by the first display device can be reflected into the human eyes with the help of external light. For ease of understanding, several possible arrangements of the first display device are described below as examples.

In some embodiments, the first display unit set in the first display device may include a plurality of first display units. The first display unit may include at least three types of charged particles, and different charged particles may have different color attributes. Each first display unit may be viewed as a transparent capsule containing a variety of charged particles inside. At least three types of charged particles may have many possibilities. For example, each first display unit may include charges dyed black, charges dyed white, and at least one charge dyed other than black and white.

Correspondingly, by controlling the distribution of the at least three types of charged particles in the first display unit by applying a voltage to the first display unit, a first display unit can display at least one color, and the first display unit set can display at least three colors.

In some embodiments, the first display unit set including a plurality of first display units may be that the first display unit set includes a plurality of first display unit groups, where each first display unit group may include at least three first display units and a filter film covering each first display unit. In some embodiments, each first display unit may include charged particles of two different colors, and the colors of the filter films covering different display units in the same first display unit group may be different.

Correspondingly, for each first display unit group, by applying a voltage to each first display unit in the first display unit group and controlling the distribution of two types of charged particles in each first display unit, the color of light mixed by the filter films on at least three first display units in the first display unit group after being illuminated by light from outside the electronic device can be changed. Since different first display unit groups may be able to present different colors, the first display unit set may ultimately be able to present at least three colors.

For example, a first display unit in the in the first display unit group may include black charged particles and white charged particles, and the same first display unit group may at least include a first display unit covered with a red filter film, a first display unit covered with a green filter film, and a first display unit covered with a blue filter film.

Based on this, by controlling the voltage applied to different first display units in the first display unit group, the distribution of charged particles in different first display units in the first display unit group can be controlled, and the color ratios of red, yellow, and blue that are required to be mixed by at least three first display units in the first display unit group when reflected by external light can be changed to present the resulting light color, which is the mixture of at least these three colors.

For example, assume that the first display unit group includes a display unit A covered with a red filter film, a display unit B covered with a green filter film, and a display unit C covered with a blue filter film, and these three display units include black charged particles and white charged particles.

Assume that the first display unit group needs to present the green color, the voltage applied to each first display unit in the first display unit group may be controlled such that the black charged particles in the display unit A and the display unit C face upward, while the white charged particles face downward.

Figure 3:
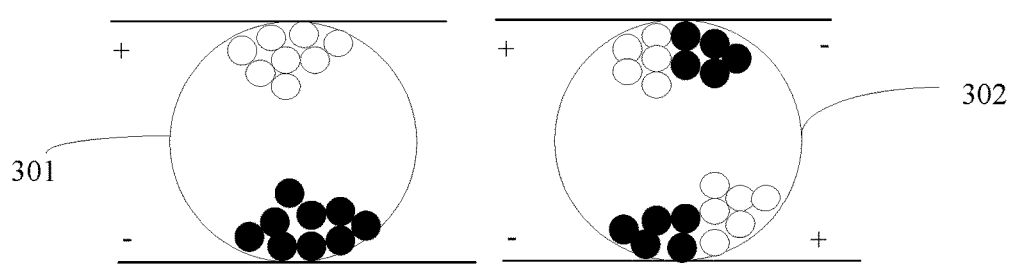
FIG. 3 is a schematic distribution diagram of two types of charged particles in a first display unit of the electronic device according to an embodiment of the present disclosure.

For ease of understanding, reference can be made to FIG. 3, which is a schematic distribution diagram of two types of charged particles in the display unit. After an electric field as shown in FIG. 3 is applied to the display unit 301, the white charged particles (shown as white circles in FIG. 3) in the display unit 301 move upward, while the black charged particles (shown as black circles in FIG. 3) move downward. As for display unit 302, after applying the electric field as shown in FIG. 3, some of the white charged particles in the display unit 302 move upward, and some of the white charged particles move downward. Similarly, some of the white charged particles move upward and some of the black charged particles move downward. Of course, FIG. 3 is an example illustration to facilitate understanding of the movement and distribution of charged particles in the display unit, the specific method of controlling the distribution of charged particles in the display unit is not limited in the embodiments of the present disclosure.

Although the tops of the display units A and C are covered with colored filter films, since all the black charged particles in the display units A and C are located at the top, the filter films on the display units A and C will not reflect cover from external light. For display unit B, the applied voltage can be controlled such that the white charged particles in display unit B are on top and the black charged particles are at the bottom. In this way, the green filter film above display unit B has a substrate formed of white charged particles such that green color of the green filter film can be reflected after light from outside the electronic device illuminates the display unit B.

Of course, the description above is only an example. In practical applications, the voltage applied to each first display unit can be controlled as needed, and the proportion of upward and downward charged particles of each color in each first display unit can also be controlled. In this way, the proportion of the color reflected by the filter film on each first display unit in each first display unit group can change to change the final color presented after mixing the colors reflected by the filter films on at least three display units in the first display unit group.

It should be understood that that the specific form of the first display device is not limited to the embodiments of the present disclosure. For example, the first display device may be a color electronic ink screen. With the development of technology, the first display device can also be other display devices that can reflect the image presented by the first display device into the human eyes with the help of external light, which is not limited in the embodiments of the present disclosure.

Based on the foregoing description, it can be seen that the first display device can support at least three colors such that the first display unit can support displaying color images, thereby meeting the user's viewing needs for color images. In addition, since the first display device can reflect the image it presents into the human eyes with the help of external light, and does not need to rely on the first display device to emit backlight to project the image into the human eyes, the power consumed by emitting the backlight light can be reduced such that the first display device only needs lower power consumption to achieve image presentation.

In the present disclosure, a variety of different relative positions between the first body and the second body may be achieved through the connecting device. The following is a description of several possible arrangements.

In the first arrangement, the first body can rotate around the first reference line through the connecting device, and the first reference line and the third side of the second body satisfy a parallel condition. The second body has a third side and a fourth side, a first interactive device being disposed on the third side of the second body.

In this case, the electronic device has two modes.

In the first mode, the relative positional relationship between the first body and the second body satisfies an angle condition, and the first side of the first body is on one side of the second body. The angle condition is a condition that enables the user to operate the first interactive device on the third side of the second body and at the same time view the display device on one side of the first body in the first body.

This mode can take the form of the electronic device as shown in FIG. 1, and this mode can be regarded as a laptop mode. It can be seen from FIG. 1 that the first body 101 and the second body 102 have a certain opening angle. At this time, the first side 104 of the first body 101 faces away from the second body, and the second side 105 of the first body 101 faces toward the second body. In this case, the display device suitable for operation by the user is the second display device 107 on the second side 105 of the first body 101. Based on this, for ease of distinction, the laptop mode in which the electronic device is in can be referred to the laptop mode of the second display device.

Figure 4:
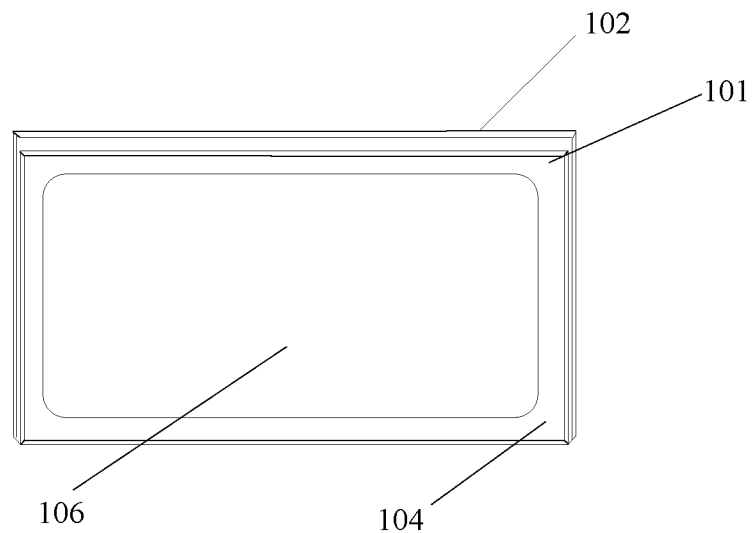
FIG. 4 is a schematic diagram of another mode in which the electronic device is in according to an embodiment of the present disclosure.

In the second mode, the first body and the second body satisfy an overlapping condition, and the second side of the first body faces the third side of the second body. This mode of the electronic device is shown in FIG. 4. It can be seen from FIG. 4 that this mode can be regarded as a tablet mode. In this mode, the first display device 106 on the first side 104 of the first body 101 is exposed, and the user can view and operate the first display device, but the second display device on the second side of the first body is blocked and cannot be viewed and operated. Based on this, the tablet mode corresponding to this mode can be referred to as the first display device tablet mode.

In the second arrangement, the first body is rotatable around the first reference line through the connecting device. In addition, by rotating the first body around the first reference line, the rotation angle of the first body around the second body can satisfy a circumferential angle condition. The circumferential angle condition is the condition under which the angle of the first body surrounding the second body can be determined to rotate once, that is, 360°. However, in practical applications, the angle of the first body surrounding the second body may be close to 360° or there may be a certain deviation from 360°.

In this case, by rotating the first body around the first reference line, the electronic device can at least transform from a posture in which the first body and the second body satisfy the overlapping condition and the second side of the first body faces the third side of the second body, to a posture where the first body and the second body satisfy the overlapping condition and the first side of the first body faces the fourth side of the second body.

Correspondingly, in this case, the electronic device has three modes.

Figure 7:
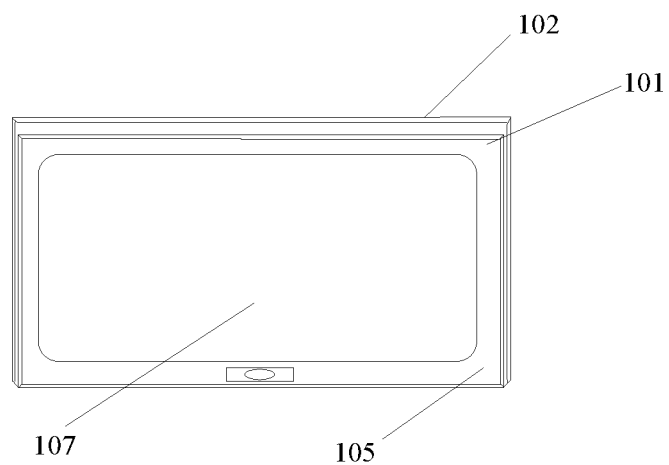
FIG. 7 is a schematic diagram of another mode in which the electronic device is in according to an embodiment of the present disclosure.

The first mode is the first display device tablet mode described above and shown in FIG. 4, and the second mode is the second display device laptop mode described above and shown in FIG. 1. In the third mode, the first body and the second body satisfy the overlapping condition, and the first side of the first body faces the fourth side of the second body. In this case, the third side of the second body is not blocked by the first body, and the corresponding first interactive device (such as a keyboard) on the third side of the second body is not blocked by the first body. This mode is another tablet mode, as shown in FIG. 7. As shown in FIG. 7, in this mode of the electronic device, the first body 101 and the second body 102 overlap, the first display device on the first body is blocked, and the first display device on the first body blocks the fourth side of the second body such that the third side of the second body is not blocked. At the same time, the second display device 107 on the second side 105 of the first body 101 is exposed by the second body, and the user can view and operate the second display device. Based on this, the tablet mode corresponding to this mode can be referred to as the first tablet mode of the second display device.

In the third arrangement, considering that both the first side and the second side of the first body of the electronic device are provided with display devices, in order to increase the operational flexibility of the electronic device, the user may also use any display device on both sides of the first body in different ways. In the present disclosure, the first body may also rate around two different reference directions through the connecting device.

In some embodiments, the first body and the second body may both be plate-shaped. The connecting device may include a first component and a second component.

The first component may connect the first end of the first body and the second end of the second body to enable the first body to rotate around the first reference line. The second component may connect the first end of the first body and the second end of the second body to enable the first body to rotate around a second reference line. The first end of the first body may refer to the part of the first body that connects the first component and the second component, and the second end of the second body may refer to the part of the first body that connects the first component and the second component.

Of course, in the first arrangement and the second arrangement described above, the connecting device may also be the same as the connecting device in the third arrangement.

As described above, the first reference line and the third side of the second body may satisfy the parallel condition. In some embodiments, the first interaction device on the third side of the second body may be any human-computer interaction device. For example, the first interaction device may include one or both of a keyboard and a touchpad.

In some embodiments, the first interaction device may include a display device and a touch device such that the first interactive device can support a display function and a touch function. For example, the first interactive device may be a display device that supports a touch function, and the display principle of the display device can be the same as the display principle of the first display device such that the display device can support a handwriting pad or a writing pad.

The display device as the first interactive device may be another display device independent of the first display device and the second display device, or may be a display device of the same type as the second display device.

In particular, when the display device as the first interactive device and the second display device belong to the same type of display device, the display device as the first interactive device can also be spliced together with the second display device to form a larger size display device.

The second reference line may meet a perpendicular condition with the first reference line, and satisfy the parallel condition with the first side of the first body. Of course, the second reference line, the plane of the first body, and the second side of the first body may also meet the parallel condition.

The first reference line and the second reference line may be regarded as an axes, axial directions, or reference directions, which is not limited in the embodiments of the present disclosure.

In some embodiments, the first reference line and the second reference line satisfying the perpendicular condition may be that the first reference line and the second reference line satisfy the condition of being perpendicular to each other. For example, the first reference line and the second reference line may be perpendicular to each other, or the absolute value of the difference between the angle between the first reference line and the second reference line and 90° is less than a set first angle threshold.

For example, the first angle threshold is 5°. If the angle between the first reference line and the second reference line is equal to 90°, or greater than 90° but not greater than 95°, or less than 90° but greater than 95°, the first reference line and the second reference line can be determined to satisfy the perpendicular condition.

Similarly, the first reference line and the third side of the second body satisfy the parallel condition may be that the first reference line and the third side of the second body can be determined to be parallel. For example, the first reference line may be parallel to the third side of the second body. Or the first reference line may be substantially parallel to the third side of the second body. For example, the angle between the first reference line and the third side of the second body may be greater than 0° but less than a second angle threshold. The second angle threshold may be the same as or different from the first angle threshold.

For ease of understanding, the following description is provided in conjunction with the accompanying drawings.

In the electronic device shown in FIG. 1, the first reference line can be considered to be parallel to the side where the first end of the first body is located, as shown in the bottom edge of the first side of the first body shown in FIG. 1. Based on this, the first body can rotate around the first reference line through the connecting device (the first component and the second component of the connecting device are not shown in FIG. 1), and the angle (commonly known as the opening angle) between the first body 101 and the second body 102 can be changed, such that the angle between the second side of the first body and the third side of the second body can increase or decrease.

As can be seen from FIG. 1, the first body and the second body are perpendicular to each other (or the angle is greater than) 90°. Based on FIG. 1, by rotating the first body 101 around the first reference line and toward the side closer to the second body 102, and angle between the first body 101 and the second body 102 can be adjusted. That is, the angle between the second side 105 of the second body 102 and a third side 108 of the second body 102 can gradually decrease. In this way, the angle between the second side of the first body and the third side of the second body in the electronic device can gradually decrease from 90° (or greater than) 90°, and ultimately the angle relationship between the first body and the second body can be changed from FIG. 1 to FIG. 2.

Based on FIG. 2, the first body can continue to rotate around the first reference line and toward the side closer to the second body. At the end, the second side of the first body and the third side of the second body can overlap or substantially overlap to achieve the relative positional relationship between the first body 101 and the second body 102 in the electronic device as shown in FIG. 4.

Of course, based on FIG. 1, by rotating the first body around the first reference line and away from the second body 102, the angle between the second side 105 of the first body 101 and the third side 108 of the second body 102 can gradually increase. For example, at the end, the first body and the second body can be on the same plane or the angle between the second side of the first body and the third side of the second body can reach a set maximum opening angle. For example, the maximum opening angle may be 180°, 135°, etc. which is not limited in the embodiments of the present disclosure.

In some embodiments, since the second reference line and the first reference line satisfy the perpendicular condition (such as being perpendicular to each other), and the second reference line is parallel to the first body, the rotation of the first body around the second reference line can be regarded as a rotation around a center perpendicular line of the first body.

Figure 5:
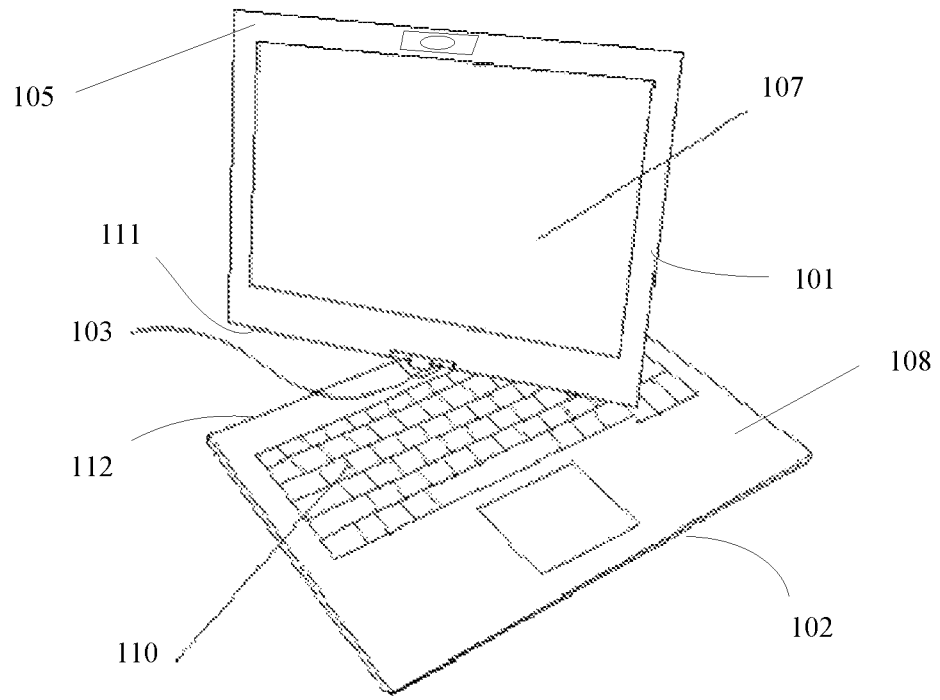
FIG. 5 is a schematic diagram of the first body of the electronic device rotating around a second reference line according to an embodiment of the present disclosure.

For example, as shown in FIG. 5, the first body 101 rotating around the second reference line can cause the bottom edge 111 of the first body 101 and the top edge 112 of the second body to rotate from being parallel to each other to no longer being parallel.

Based on FIG. 5, if the first body continues to rotate around the second reference line, the second side of the first body is no longer on the side of the second body. At the end, the first side of the first body will be on the side of the second body to obtain the mode of the electronic device as shown in FIG. 6.

Figure 6:
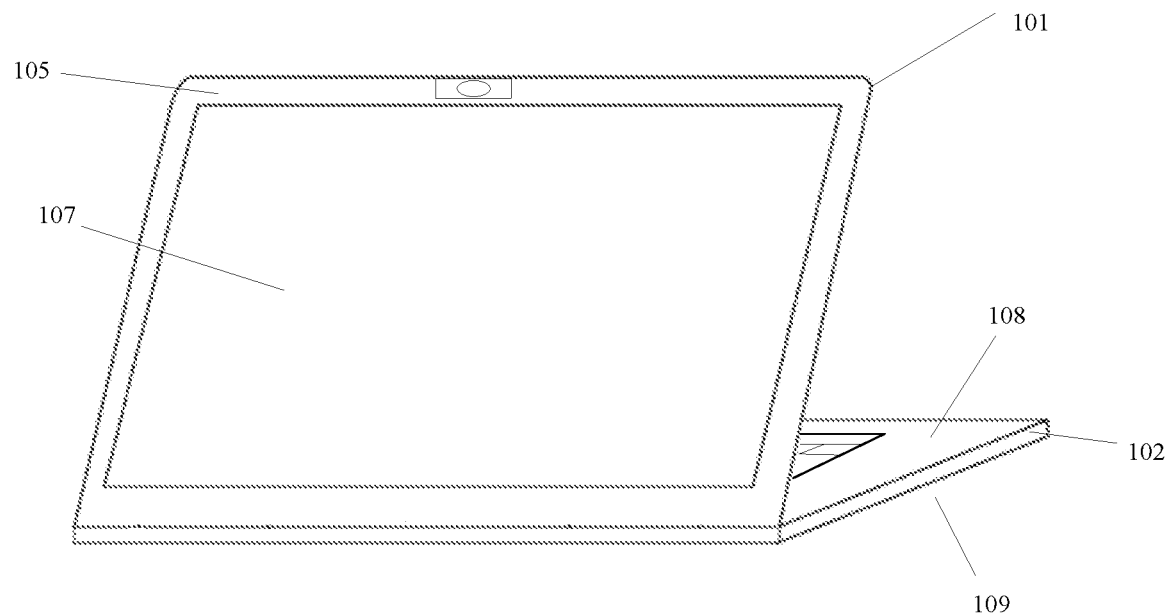
FIG. 6 is a schematic diagram of another mode in which the electronic device is in according to an embodiment of the present disclosure.

In the electronic device shown in FIG. 6, the first side of the first body 101 is on the side of the second body (as shown in FIG. 6, the first side of the first body faces the third side of the second body as an example), and the second side 105 of the first body 101 is on the side facing away from the second body. That is, the second display device on the second side 105 of the first body 101 faces away from the second body.

Comparing FIG. 2 and FIG. 6, it can be seen that based on FIG. 1, by rotating the first body 101 around the second reference line, the first side 104 and the second side 105 of the first body 101 can be flipped. In this way, the electronic device can be gradually rotated from the first display device 106 on the second side 105 of the first body 101 being on the side of the second body 102 to the first display device 106 on the first side 104 of the first body being on the side of the second body 102.

Based on the description of the three possible arrangements above, it can be seen that by rotating the first body around at least one of the first reference line and the second reference line, the electronic device can have multiple modes. In the present disclosure, by rotating the first body around at least one of the first reference line and second reference line, the electronic device can be switched between a first mode, a second mode, a third mode, and a fourth mode.

In some embodiments, when the electronic device is in the first mode, the relative positional relationship between the first body and the second body may satisfy an angle condition, and the first side of the first body may be on one side of the second body.

In some embodiments, the relative positional relationship between the first body and the second body satisfying the angle condition enables the user to operate the first interactive device on the third side of the second body, and at the same time view the display device on one side of the first body in the first body.

For example, when the first side of the first body is on one side of the second body, the angle condition may be a condition that enables the user to view the first display device on the first side of the first body while operating the first interactive device on the second body. For example, the angle condition may be an angle range from 75° to 180°.

Of course, the angle condition can also be set as needed, which is not limited in the embodiments of the present disclosure.

In some embodiments, the electronic device being in the first mode is equivalent to the mode of the electronic device is in and shown in FIG. 1, after the first body is rotated around the second reference line such that the first side and the second side of the first body are flipped. For ease of understanding, reference can be made to FIG. 6. FIG. 6 is a rear view of the electronic device shown in FIG. 1 after the first side and the second side of the first body of the electronic device are flipped. In the case of the electronic device shown in FIG. 6, when the user uses the electronic device, the first side of the first body will generally face the user.

It can be understood that when the electronic device is in the first mode, considering the user's operating habits, the first display device of the electronic device can be in a working state such that the user can view the image output by the first display device while operating the first interactive device on the second body.

When the electronic device is in the first mode, the second display device of the electronic device may be in a non-working state. For example, the second display device may be in a standby state or a closed state, which is not limited in the embodiments of the present disclosure.

It can be seen from FIG. 6 that when the electronic device is in the first mode, the electronic device is also in a laptop mode. However, in this laptop mode, while the user performs operations on the first interactive device on the second body, the user can see that the display device being operated is the first display device. Therefore, when the electronic device is in the first mode, it can also be referred to the first display device laptop mode.

When the electronic device is in the second mode, the relative positional relationship between the first body and the second body may satisfy an angle condition, and the second side of the second body may be on one side of the second body.

FIG. 1 is a schematic diagram of the electronic device in the second mode. It can be seen from FIG. 1 that when the electronic device is in the second mode, the second display device 107 on the second side of the first body is on one side of the second body. In this way, the user can view the second display device 107 while operating on the first interactive device 110 in the second body. Based on this, when the electronic device is in the second mode, the second display device can be in a working state.

Based on FIG. 1 and the previous description, it can be seen that when the electronic device is in the second mode, it is actually in the second display device laptop mode.

Of course, considering the display characteristics of the first display device in the display device, compared with the second display device, the power consumption required by the first display device after startup is relatively low. Therefore, when the electronic device is in the second mode, while the second display device of the electronic device is in the working state, the second display device may also present a specified image. In some embodiments, the specified image may be a set wallpaper, which is not limited in the embodiments of the present disclosure.

When the electronic device is in the third mode, the first body and the second body may satisfy an overlapping condition, and the first side of the first body may face the third side of the second body.

In some embodiments, the first body and the second body satisfying the overlapping condition may be a condition in which the first body and the second body overlap each other, or a condition in which the first body and the second body can be determined to be in an overlapping state. For example, if the first body and the second body satisfy the overlapping condition, the first body and the second body may be mutually attached.

In some embodiments, considering that in practical applications, the first body and the second body may not completely overlap, but can only be in a substantially overlapping state, or, specific effects can be achieved without the complete overlap of the first body and the second body, based on this, the first body and the second body satisfying the overlapping condition may also be that the angle between the first body and the second body is less than a set angle. The angle at this time may refer to the angle between the side of the first body facing the second body (which can be the first side of the second side of the first body) and the third side of the second body. For example, the overlapping condition between the first body and the second body may be that the minimum angle between the first body and the second body is between 0° to 10°.

For example, based on FIG. 6, if the first body is rotated around the first reference line and toward the side of the second body, the first body and the second body will overlap or substantially overlap. In this way, the second side 105 of the first body 101 is exposed, and the user can view the second display device 107 on the second side 105 of the first body 101. Based on FIG. 6, if the first body continues to rotate around the first reference line and toward the side of the second body, the electronic device will be in the third mode.

It should be noted that the difference between the third mode and the first tablet mode of the second display device corresponding to FIG. 7 is that although the first body and the second body satisfy the overlapping condition, in the third mode, the first side of the first body faces the third side of the second body such that the third side of the second body is blocked by the first body. In this way, the first interactive device on the third side of the second body is blocked.

The third mode is another tablet mode in which the second display device can be used. In order to distinguish the third mode from the first tablet mode of the second display device, the third mode can also be referred to the second tablet mode of the second display device.

In some embodiments, when the electronic device is in the third mode, the second display device can be exposed, but the first display device cannot be exposed. Therefore, the second display device of the electronic device can be in a working state such that the user can view the content being displayed by the second display device, and the first display device can be in a non-working state, such as being off or in a standby mode. Of course, in the third mode, the user can also perform touch operations on the second display device to input corresponding operation instructions.

When the electronic device is in the fourth mode, the first body and the second body may satisfy an overlapping condition, and the second side of the first body may face the third side of the second body.

For example, based on the electronic device shown in FIG. 1 being in the second mode, if the first body 101 of the electronic device rotates around the first reference line and toward the side closer to the second body, the first body and the second body can satisfy the overlapping condition and the second side of the first body can face the third side of the second body, that is, the fourth mode of the electronic device as shown in FIG. 4. It can be seen from FIG. 4 that when the electronic device is in the fourth mode, the first side of the first body is exposed such that the user can see the first display device on the first side of the first body.

Based on this, when the electronic device is in the fourth mode, the first display device can be in the working state, and the second display device can be in the non-working state.

Based on FIG. 4 and the previous description, it can be seen that when the electronic device is in the fourth mode, it is actually the first display device tablet mode.

As can be seen from above description, since the relative positions of the first body and the second body can be changed through the connecting device, the relative positions of the first display device and the second display device on the first body relative to the second body can be changed. In this way, the user can more flexibly use different types of display devices through one electronic device, thereby increasing the diversity of usage modes of the electronic device.

Based on any of the foregoing embodiments of the electronic device, the electronic device may run an operating system through a processing module, and perform display control of the first display device or the second display device based on the operating system.

In some embodiments, considering the different operating habits of the electronic device in different usage mode, in the present disclosure, the electronic device may further include a first processing module and a second processing module.

The first processing module may be used to run the first operating system and execute display control of the first display device, or the second display device based on the first operating system. The second processing module may be used to run a second operating system and execute display control of the first display device, or the second display device based on the second operating system.

In some embodiments, the first operating system may be different from the second operating system. For example, the first operating system may be a Windows® operating system, and the second operating system may be an Android operating system. Of course, the first operating system and the second operating system may be other systems, which is not limited in the embodiments of the present disclosure.

It should be understood that in order to reasonably control the working state and content display of the first display device and the second display device, the first processing module and the second processing module may be configured to determine the mode in which the electronic device is in, and reasonably start the first operating system or the second operating system based on the mode in which the electronic device is in.

For example, at least one sensor may be disposed at the electronic device, and the sensing value sensed by the at least one sensor can reflect the relative positional relationship between the first body and the second body. Based on this, the first processing module and the second processing module can obtain the respective sensing values of the at least one sensor, and determine the relative positional relationship between the first body and the second body through the sensing values of the at least one sensor. Combined with the relative positional relationship between the first body and the second body, the mode in which the electronic device is in can be determined.

In some embodiments, the relative positional relationship between the first body and the second body may include not only the angle between the first body and the second body and the overlap (e.g., whether the overlapping condition is satisfied), and may also include the relative positional relationship between the first side and the second side of the first body relative to the second body and the third side of the second body. For example, whether the first side of the first body is on the side of the second body, or whether the first side of the first body faces the third side of the second body, etc. Based on this, based on the relative positional relationship between the first body and the second body, the mode in which the electronic device is in can be determined.

It should be understood that there are many possible ways for the first processing module and the second processing module to determine the mode of the electronic device based on the sensor, which is not limited in the embodiments of the present disclosure.

For ease of understanding the display control of the first display device and the second display device by the first processing module and the second processing module, several possible scenarios will be described below.

When the electronic device is in the fourth mode, that is, when the electronic device is in the mode as shown in FIG. 4, the first display device 106 on the first side 104 of the first body 101 is exposed. For example, the electronic device can be regarded as a tablet usage mode (this arrangement is similar for other non-tablet usage modes in which the electronic device is in the fourth mode and the first body and the second body do not overlap but satisfy the overlapping condition). Combining the characteristics of the electronic device in the fourth mode and taking into account the user's operating habits, the electronic device is more suitable for controlling the first display device to output display content based on the first operating system.

Based on this, after the electronic device is started and the first display device is turned on, the first processing module can determine that the electronic device is in the fourth mode, run the first operating system, and control the first operating system to output display content to the second display device. At the same time, since the second display device is not exposed, the second display device is still in the closed state.

For example. Assume that the first operating system is an Android system, and the second operating system is a Windows® operating system. At the same time, for ease of understanding of the difference between the first display device and the second display device, the first display device is a color ink screen, and the second display device is an OLED display screen.

When the electronic device is in the fourth mode, for example, the electronic device can be regarded as being in the tablet usage mode, considering the characteristics of users using tablets, it is more suitable to start the Android operating system when the electronic device is in the fourth mode. Based on this, users can perform document review, handwriting operations, drawing operations, and web browsing through the color ink screen.

While the electronic device is in the fourth mode, if the user rotates the first body around the first reference line to the side away from the second body, the electronic device will enter the second mode. That is, the electronic device will be in the second mode as shown in FIG. 1. When the electronic device enters the second mode, it indicates that the user needs to use the second display device. At this time, the electronic device is equivalent to a laptop mode.

Based on this, when the electronic device is in the second mode, the second display device can be activated. The second processing module may determine that the electronic device is in the second mode, and the second processing module may run the second operating system and control the second display device to output display content based on the second operating system. At the same time, the first processing module may control the first display device to be turned off, or may control the first display device to output a specified image, such as a wallpaper, through the first operating system.

Continuing with the above example in which the first display device is a color ink screen and the second display device is an OLED display screen. When the electronic device is in the second mode shown in FIG. 1, the second display device (the OLED display screen) is in the working state. Considering the user's operating habits, the second processing module may run the Windows® operating system and control the OLED display screen to output display content based on the Windows® operating system. At the same time, the first processing module may turn off the color ink screen. In particular, considering that the power consumption of the color ink screen is relatively low, the first processing module may also control the color ink screen to output a specified background image based on the first operating system.

When the electronic device is in the second mode shown in FIG. 1, the first body 101 of the electronic device is rotated around the second reference line, and ultimately the first side 104 and the second side 105 of the first body 101 can be flipped. At this point, the first side 104 of the first body is on one side of the second body, the second side of the first body faces away from the second body, and the electronic device enters the first mode.

When the electronic device is in the first mode, the electronic device remains to be in the laptop usage mode. In this case, considering the user's operating habits and the relatively high power consumption of the second display device, the first display device can be kept in the working state and the second display device can be turned off. At the same time, after determining that the electronic device is in the first mode, the second processing module can run the second operating system and control the first display device to output display content based on the second operating system. After determining that the electronic device is in the first mode, the first processing module may end the operation of the first operating system, or may only maintain the operation of the first operating system but not perform related operations such as display control based on the first operating system.

Continuing with the above example in which the first display device is a color ink screen and the second display device is an OLED display screen. When the electronic device is in the first mode, the color ink screen may be on the third side of the first body with the keyboard. Based on this, the second processing module can control the display content output by the color ink screen through the Windows® operating system. In this third mode, the user can use the electronic device to perform all operations under the Windows® operating system and view the content displayed on the color ink screen.

Since the color ink screen is less harmful to the user's eyes, but the screen refresh rate is also relatively low, when the electronic device is in the first mode, the user can also enter a light working mode, which allows the user to operate some applications that have relatively low refresh rate requirements in this mode.

When the electronic device is in the first mode, if the first body is rotated around the first reference line and toward one side of the second body, and the first body and the second body ultimately meet the overlapping condition and the first side of the first body faces the second body, the electronic device will enter the third mode.

After the electronic device switches from the first mode to the third mode, since the second display device on the first body is exposed, it is more suitable for the user to operate the second display device at this time. The second display device can be in a working state while the first display device is in a non-working state such as being turned off.

In the third mode, the first processing module may run the first operating system and control the second display device to output display content based on the first operating system, or the second processing module may run the second operating system and control the second display device to output display content based on the second operating system. The specific function of the second processing module can be set as needed or selected by the user.

For example, when switching from the first mode or other modes to the third mode, the first processing module or the second processing module may output selection prompt information to the second display device. The selection prompt information may be used to prompt the user to choose to enter the first operating system or the second operating system.

Based on this, if the user chooses to enter the first operating system, the first processing module will start the first operating system and control the second display device to output display content based on the second operating system. On the contrary, if the user chooses to enter the second operating system, the second processing module will start the second operating system and control the second display device to output display content based on the second operating system.

In particular, when switching from the first mode or other modes to the third mode, the first processing module or the second processing module may also output a mode entry prompt for the third mode. The mode entry prompt may be used to prompt the user to choose whether to enter the third mode. Based on this, if the user chooses to enter the third mode, the first processing module and the second processing module can determine that the electronic device is in the third mode; if the user chooses not to enter the third mode, the second display device can be turned off.

Further, when the electronic device is in the third mode, and the first processing module controls the display content output by the second display device based on the first system, then after detecting that the power-off key corresponding to the second display device is pressed, the second display device may enter the sleep mode. If it is detected that the power-off key is pressed for longer than the first set time, the electronic device may turn off the second display device.

When the electronic device is in the third mode, and the first processing module controls the display content output by the second display device based on the first system, if it is detected that the power-off key is pressed for longer than a second set time, the electronic device may turn off the second display device.

In any of the foregoing embodiments of the electronic device of the present disclosure, in order to further improve the flexibility of use of the electronic device and the diversification of functions of the electronic device and also improve the user's convenience in operating the electronic device, in the present disclosure, the electronic device may also include a second interactive device.

In some embodiments, when the first body and the second body are in any relative positional relationship, the second interactive device may be at least partially unblocked, and when the first interactive device is blocked by the first body, the second interactive device may not be blocked.

Any relative positional relationship between the first body and the second body described above may include: the connecting device of the electronic device only supports the rotation of the first body around the first reference line, the connecting device only supports the rotation of the first body around the second reference line, or the connecting device can support the rotation of the first body around the first reference line and the second reference line. In these arrangements, the first body and the second body in the electronic device can exhibit any relative positional relationship.

Take the first arrangement where the first body can rotate around the first reference line as an example. The electronic device may have a second display device in the laptop mode and a first display device in the tablet mode. In both modes, the first interactive device cannot be completely blocked. In particular, in the tablet mode of the first display device, as shown in FIG. 4, although the first interactive device is blocked by the first body, the second interactive device will not be blocked.

Of course, the different modes that the electronic device has under several other possible arrangements are also similar and will not be described again.

In some embodiments, the second interactive device may be a device different from the first interactive device and capable of realizing human-computer interaction. For example, the first interactive device may be an input control device, a display device used to display information; or the first interactive device may be an interactive device that supports both input control and information display.

It should be understood that the second interactive device will not be completely blocked when the first body and the second body are in any relative position. Therefore, when the first body and the second body are in any relative positional relationship, the user can perform interactive operations based on the second interactive device, which can improve the convenience of the user to perform some control operations based on the second interactive operation.

In some embodiments, the second interactive device may be disposed on the third side of the second body and close to the first side of the third side connected to the connecting device. At the same time, in order to prevent the first body from blocking or completely blocking the second interactive device, an opening for accommodating the second interactive device may be opened on the second side of the first body connected to the connecting device.

Figure 8:
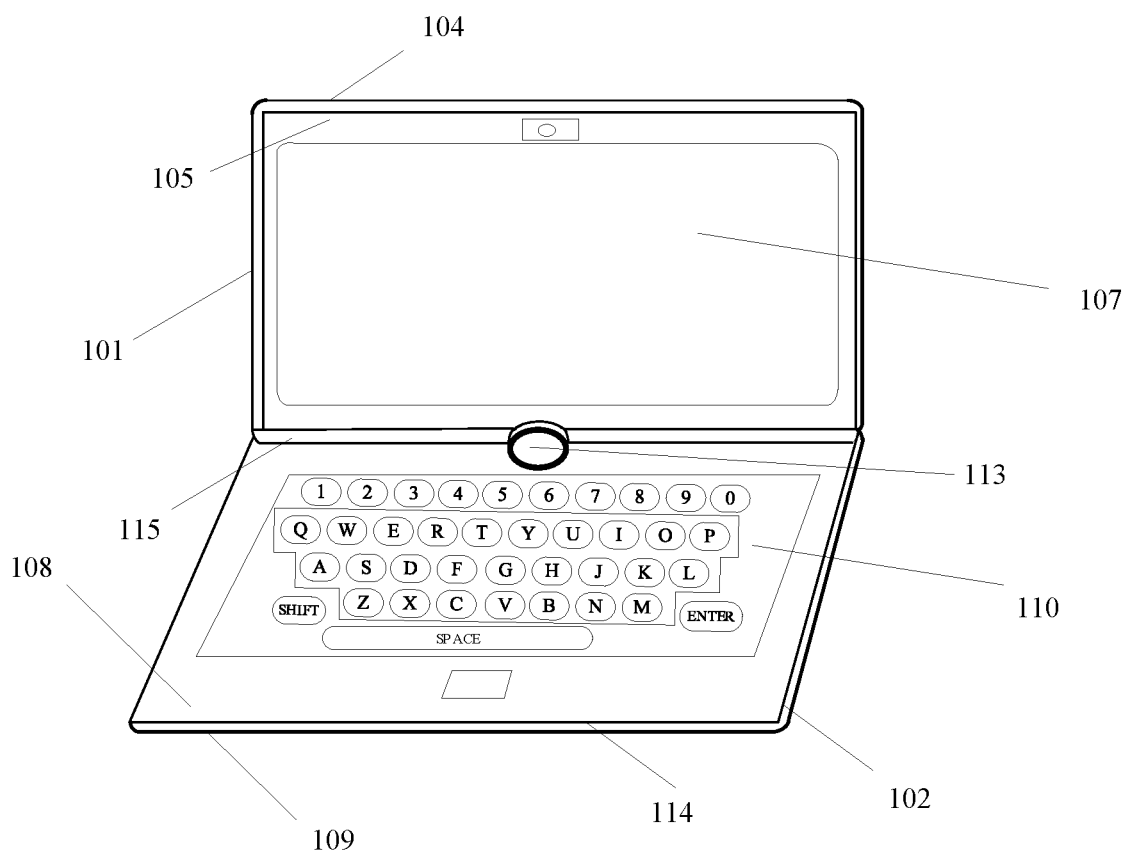
FIG. 8 is another schematic structural diagram of the electronic device according to an embodiment of the present disclosure.
Figure 9:
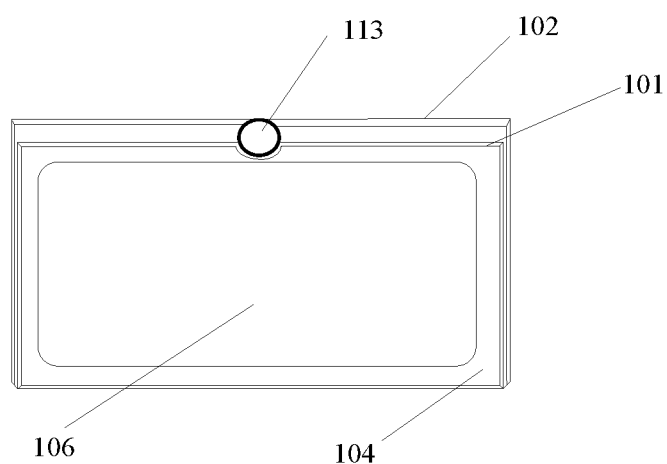
FIG. 9 is a schematic diagram showing a relative relationship between a third display device and the first body of the electronic device according to an embodiment of the present disclosure.

The following takes an arrangement as an example, which is explained in detail in conjunction with FIG. 8 and FIG. 9.

As shown in FIG. 8, a second interactive device 113 is disposed on the third side 108 of the second body 102. The second interactive device 113 is located on the first edge of the third side 108 of the second body 102 connected to the connecting device (not shown in FIG. 8). The first side is the side parallel to the bottom side 114 on the third side of the second body in FIG. 8.

At the same time, an opening for accommodating the second interactive device 113 is opened on the second side 115 of the first body connected to the connecting device. For example, in FIG. 8, the top surface of the second interactive device is circular, and the opening provided on the first body is a semicircle.

Since the first body has an opening for accommodating the second interactive device, when the first body rotates around the first reference line and the second reference line, the rotation of the first body will not be affected by the obstruction of the second interactive device.

At the same time, since the first body has an opening for accommodating the second interactive device 113, the blocking of the second interactive device by the first body can also be reduced.

FIG. 8 shows a schematic diagram of the electronic device in the second mode. It can be seen from FIG. 8 that based on the user's daily operating habits, the second interactive device 113 is not blocked when the electronic device is in the second mode.

Of course, as the first body rotates around the first reference line, if the angle between the first body and the second body is less than the set angle, the first body may block part of the content of the second interactive device, but it will not completely block the second interactive device. For example, when the first body and the second body are perpendicular to each other, the first body will also be perpendicular to the top surface of the second interactive device such that the part of the second interactive device located on the second side of the first body may be blocked, while the part of the second interactive device located on the first side of the first body will not be blocked.

FIG. 8 is an example where the electronic device is in the second mode. However, relative to the second mode of the electronic device, the only different between the electronic device is in the first mode is that the first display device on the first body is on one side of the second body. Therefore, when the electronic device is in the first mode, the first body cannot completely block the second interactive device.

Based on FIG. 8, when the first body 101 of the electronic device rotates around the first reference line such that the first body 101 and the second body 102 meet the overlapping condition, and the second side of the first body faces the third side of the second body, at this time, the electronic device will enter the fourth mode, that is, the mode shown in FIG. 9. As shown in FIG. 9, when the electronic device is in the fourth mode, the first interactive device on the third side of the second body is blocked. However, since the first body 101 has an opening to accommodate the second interactive device 113, the second interactive device cannot be blocked such that the user can still view or operate the second interactive device.

Of course, when the electronic device is in the third mode, the relative positional relationship between the second interactive device and the first body is similar to the positional relationship between the first body and the second interactive device shown in the second mode in FIG. 9. Therefore, the second interactive device will also not be blocked by the first body.

It can be understood that the second interactive device may be independent of the connecting device connecting the first body and the second body.

In particular, in order to effectively reduce the space occupied by the second interactive device, in one possible implementation, the second interactive device may reuse the connecting device, that is, the connecting device may be used to carry the second interactive device.

For example, in addition to the first component supporting rotation around the first reference line and the second component supporting rotation around the second reference line, a central axis may also be provided, and the second interactive device may be arranged on the central axis of the connecting device. For example, in FIG. 8, the connecting device carrying the second interactive device is a cylinder, and the second interactive device is provided on top of the cylinder.

In the present disclosure, there are many possible interaction modes supported by the second interactive device, and correspondingly, there are many possibilities for the specific type of the second interactive device.

In some embodiments, the second interactive device may include a control knob. Control commands may be input to the electronic device through this control knob. For example, the control knob may be a rotatable knob, and the use may achieve different input controls by rotating the control knob in different directions.

The control functions that can be achieved by the control knob may be set based on actual needs. For example, the control knob may be used to adjust the volume of the output audio of the electronic device, to adjust the display brightness of the first display device or the second display device of the electronic device, or adjust the refresh rate of the first display device or the second display device.

In practical applications, when the electronic device is in different modes, the control functions corresponding to the control knob may also be different.

In some embodiments, the second interactive device may include a third display device. The third display device may be used to display state information of the electronic device or display at least one operation control.

In some embodiments, the state information of the electronic device may include, but is not limited to one of more of: the remaining power of the electronic device, the type of network of the electronic device is connected to, the signal strength of the network where the electronic device is located, the output volume of the electronic device, and the current time information.

In some embodiments, the operation controls displayed by the third display device may include, but are not limited to, at least one of the: volume control for volume adjustment, brightness control for display brightness adjustment, refresh rate control used to adjust the display refresh rate, and afterimage removal control for removing afterimage.

It should be understood that in practical applications, considering that the electronic device can be in different mode, the control requirements for the electronic device will also be different. Therefore, when the electronic device is in different modes, the state information or operation control options displayed by the third display device will also be different.

In some embodiments, the second interactive device may include a third display device and a control knob.

For example, the second interactive device may be a control knob with a third display device. The control knob may not only support input operations input by the user by rotating the control knob, but also support input operations input by the user through the third display device, such as input operations performed by the user on content displayed on the third display device.

Based on the previous description, when the electronic device is in different modes, the target display device that the user can or expects to operate will also be different, the target display device being one of the first display device or the second display device of the display device.

For example, combined with the previous description of the relative positional relationship between the first body and the second body of the electronic device. If the electronic device is in the first mode, that is, the first display device laptop mode, considering that the user's operating habits in the laptop mode, the user may be accustomed to operating the first display device. Therefore, the first display device may be the target display device.

Similarly, if the electronic device is in the second mode, that is, the second display device laptop mode, the target display device may be the second display device. If the electronic device is in the second display device first tablet model, that is, the second tablet mode of the second display device, the target display device may be the second target display device. If the electronic device is in the fourth mode, that is, the first display device tablet mode, the target display device may be the first display device.

In this case, in order to use the second interactive device to more reasonably control the electronic device, when the electronic device is in different modes, the second interactive device may be used to interactively control parameters associated with the target display device.

In some embodiments, the interactive control of parameters associated with the target display device may include at least one of: displaying or controlling the display parameters of the target display device, or interactively controlling the target operating system for controlling the target display device to display images.

For example, when the electronic device is in the second display device laptop mode, the target display device may be the second display device. If the second interactive device includes a control knob, the control knob may be used to control the target operating system corresponding to the second display device to adjust the output parameters of the electronic device. The output parameters may include audio output parameters, display brightness or display parameters of the second display device. In some embodiments, the second interactive device may include a third display device. The third display device may be used to display output parameters or controls related to the target operating system, such as volume control options, display brightness control options, time information obtained by the target operating system, etc.

In another example. When the electronic device is in the first display device laptop mode, the target display device may be the first display device. If the second interactive device includes a control knob, the control knob may be used to control display parameters of the first display device. The display parameters may include refresh rate and afterimage removal. If the second interactive device includes a third display device, the third display device may be used to display control options related to display parameters of the first display device, such as refresh rate control options and afterimage removal control options.

When the electronic device is in the first display device tablet mode, the specific interactive controls of the second interactive device may be similar to the interactive controls of the first display device in the laptop mode. When the electronic device is in the second display device second tablet mode, the specific interactive controls of the second interactive device may be similar to the interactive controls of the second display device in the laptop mode. Of course, the different interactive controls may be set based on actual needs, which are not limited in the embodiments of the present disclosure.

In order to be able to perform corresponding control operations based on the input operation of the second interactive device, the electronic device may further include a processing module connected to the second interactive device. The processing module may be used to obtain an input operation based on input from the second interactive device, and perform a control operation corresponding to the input operation.

For ease of distinction, in the present disclosure, the processing module connected to the second interactive device is referred to as the third processing module.

In addition, the third processing module may combine the mode of the electronic device and the difference between the first display device and the second display device in the working state of the electronic device to perform different types of control operations based on the input operation of the second interactive device.

In some embodiments, the third processing module may perform at least one of the following two types of control. In the first type of control, the third processing module may determine that the first display device is in a working state based on the mode in which the electronic device is in, and adjust the output of the first display device based on the input operation input to the second display device. In the second type of control, the third processing module may determine that the second display device is in a working state based on the mode in which the electronic device is in, and adjust the output parameters of the electronic device based on the input operation input to the second interactive device, the output parameters including audio output parameters of the electronic device or display parameters of the second display device.

For the method of determining that the first display device is in the working state based on the mode in which the electronic device is in, reference can be made to the previous description. For example, when the electronic device is in the first mode and the fourth mode, the first display device may be in the working state. It should be understood that when the first display device is in the working state, the input operation performed through the second interactive device may be a control operation related to the first display device. Correspondingly, the third processing module may adjust the output of the first display device based on the input operation of the second interactive device.

In some embodiments, adjusting the output of the first display device may include adjusting the refresh rate of the first display device, and/or adjusting the afterimage presented by the first display device, such as cleaning the afterimage of the first display device. Of course, depending on the input operation, the specific content of adjusting the output of the first display device will also be different.

Similarly, when the electronic device is in the second mode and the third mode, the third processing module may determine that the second display device is in a working mode. Based on this, the input operation of the second interactive device may be an operation related to controlling the first display device or electronic device. Correspondingly, the third processing module may adjust the output parameters of the electronic device may include controlling the display parameters the display parameters such as display brightness and refresh rate of the second display device, or adjusting the audio output parameters such as volume and volume doubling rate of the electronic device.

Of course, when the input operations for the second interactive device are different, the specific content of the third processing module adjusting the display parameters of the second display device, or the audio output parameters of the electronic device will also be different.

In the present disclosure, the third processing module may be a processing module independent of the first processing module and the second processing module. Alternatively, the third processing module may also be the first processing module or the second processing module. That is, the first processing module or the second processing module may be multiplexed to respond to and process the input operation from the second interactive device.

It should be understood that when the second interactive device includes a third display device, the third processing module may also control the third display device to present different content based on the mode in which the electronic device is in.

Further, the third processing module may also run a third operating system, and perform control operations corresponding to the input operation based on the third operating system.

In some embodiments, the third operating system may be the first operating system or the second operating system. That is, the third operating system may reuse the first operating system or the second operating system.

The third operating system may also be another operating system of the first operating system and the second operating system. In this case, the third operating system may not be the same operating system as the first operating system and the second operating system, but may be of the same type of operating system as the first operating system or the second operating system. For example, the first operating system may be an Android operating system, and the third operating system may be another Android operating system running on the third processing module.

For ease of understanding, the following takes the second interactive device as a control knob with a third display device as an example. Combined with different modes in which the electronic device is in, the content displayed by the third display device and the control operation performed by the third processing module based on the input operation of the second interactive device will be described.

When the electronic device is in the first mode, the first display device is in a working state, and the second display device is in a closed state. In this case, the third processing module can run a third operating system, and output at least one of the refresh rate controls and the afterimage removal controls to the third display device based on the third operating system.

Based on this, the third processing module can detect that the user performs an input operation on the refresh rate control or the afterimage removal control, and will control and adjust the refresh rate of the first display device or control the first display device to perform an afterimage removal operation.

For example, the first display device may be a color e-ink screen, the third operating system may be an Android operating system, and the third processing module may output the refresh rate control and the afterimage control to the third display device based on the Android operating system. If the user triggers the refresh rate adjustment by adjusting the refresh rate control in the third display device, the third processing module will control and adjust the refresh rate of the color e-ink screen.

When the electronic device is in the second mode (as shown in FIG. 8), the second display device 107 of the electronic device may be in a working state. In this case, since the user can more conveniently control the audio output parameters of the electronic device and the display parameters of the second display device through the first interactive device 110 on the second body 102 and the mouse external to the electronic device. Therefore, the third processing module can output the state information of the electronic device to the third interactive device 113 based on the third operating system, such as the power or signal strength of the electronic device.

It can be understood that in the second mode, the third processing module may not respond to the rotation control operation of the control knob. Of course, after detecting the rotation control operation of the control knob, the volume output parameters (such as volume) or display parameters (such as display brightness) of the electronic device may be adjusted based on the rotation control operation.

When the electronic device is in the third mode, the first body and the second body satisfy the overlapping condition and the second display device can be exposed and is in a working state, and the first display device is in a closed state. In this case, the first interactive device on the second body is blocked. In this way, it is inconvenient for the user to control the output parameters of the second display device of the electronic device and some controls of the electronic device.

Based on this, when the electronic device is in the third mode, the third processing module may output energy saving tips and some shortcut operation options to the second display device through the third operating system. For example, the shortcut operation options may include screen casting options, etc. In addition, the third processing module may adjust the display brightness of the second display device or adjust the volume of the electronic device in response to the rotation operation of the control knob.

As shown in FIG. 9, when the electronic device is in the fourth mode, the first display device 106 on the first side 104 of the first body 101 is in a working state, and the second display device on the second side of the first body 101 is in a closed state. In this case, the third processing module may also output at least one of the refresh rate controls and the afterimage removal control to the third interactive device 113 through the third operating system. The details are similar to when the electronic device is in the first mode, which will not be repeated here.

It should be understood that when the electronic device has a third processing module, for the specific control operations of the first processing module and the second processing module on the electronic device when the electronic device is in different modes, reference can be made to the relevant description in the foregoing embodiments, which will not be repeated here.

The terms "first," "second," "third," "fourth" and the like (if any) in the description and the claims, are used for distinguishing between similar parts and not necessarily for describing a particular sequential or chronological order. It should be understood that the data used in this way are interchangeable under appropriate circumstances and the embodiments of the disclosure described herein can be implemented in sequences other than those illustrated herein.

It should be understood that in practical applications, the suitable refresh rate of the display device of the electronic device may also be comprehensively determined based on the operating mode of the electronic device, the operating scene mode set by the user, and the type of application program currently running on the electronic device to reasonably control the refresh rate of the display device.

Embodiments in this specification may be described in a progressive manner. The features described in embodiments of the specification may be replaced or combined with each other. Each embodiment focuses on the differences from other embodiments. The same or similar parts between embodiments may be referred to each other. For device embodiments, since device embodiments are basically similar to method embodiments, the description is relatively simple. For related parts, please refer to a portion of the description of method embodiments.

In this specification, relational terms such as first and second are only used to distinguish one entity or operation from another entity or operation and do not necessarily require or imply any such actual relationship or order between these entities or operations. Moreover, the terms "including," "containing," or any other variations thereof are intended to cover non-exclusive inclusion, so that an item or a device including a series of processes, methods, articles, or devices of the elements includes not only those elements, but also other elements that are not explicitly listed, or elements inherent to such processes, methods, articles, or devices. If there are no more restrictions, the element defined by the sentence "including a" does not exclude the existence of another same element in the item or device that includes the processes, methods, articles, or devices of the above elements.

The foregoing description of the disclosed embodiments enables those skilled in the art to implement or use the present disclosure. Various modifications to these embodiments are obvious to those skilled in the art. The general principles defined herein may be implemented in another embodiment without departing from the spirit or scope of the present disclosure. Therefore, the present disclosure is not limited to embodiments shown in this specification, but should conform to the widest scope consistent with the principles and novel features disclosed in the present disclosure.

The above are only some embodiments of the present disclosure. Those of ordinary skill in the art, without departing from the principles of the present disclosure, several improvements and modifications may be made, and these improvements and modifications should be within the scope of the present disclosure.

What is claimed is:

1. An electronic device comprising:
a first body, the first body having a first side and a second side opposite the first sides;
a second body being connected to the first body through a connecting device to change a relative position of the first body and the second body;
a first display device disposed on the first side, including a first display unit set, and configured to present an image being reflected to be viewed by an external light, the display unit set being configured to present three or more colors;
a second display device having a different display principle from the first display device, disposed on the second side, and including a light-emitting unit and a second display unit set;
a first interactive device;
a second interactive device at least partially unblocked by the first body and the second body, wherein when a first interactive device is blocked by the first body, the second interactive device is not blocked; and
a processing module configured to:
obtain an input operation based on input from the second interactive device; and
determine that the first display device is in the working state based on the mode in which the electronic device is in, and adjust output of the first display device based on the input operation input to the second interactive device.

2. The electronic device of claim 1, wherein the first display unit set includes one of:
a plurality of first display units, a first display unit including at least three types of charged particles, different charged particles having different color attributes, wherein distribution of the at least three types of charged particles in the first display unit is controlled by applying a voltage to the first display unit for the first display unit to exhibit at least three colors; or,
a plurality of first display unit groups, a first display unit group including at least three first display units and filter films covering the first display units, the first display unit including two different colors of charged particles, the colors of the filter films covered on different first display units in the first display unit group being different, wherein light color mixed by the filter films on at least three first display units in the first display unit group changes after being illuminated by light from outside the electronic device by applying a voltage to each first display unit in the first display unit group and controlling the distribution of the two different colors of charged particles in each first display unit.

3. The electronic device of claim 1, wherein:
the first body and the second body are both plate-shaped;
display size of the first display device and display size of the second display device meet the same condition;
the second body includes a third side and a fourth side, the first interactive device being disposed on the third side;
the connecting device includes a first component and a second component, the first component connecting a first end of the first body and a second end of the second body for the first body to rotate around a first reference line, the second component connecting the first end of the first body and the second end of the second body for the first body to rotate around a second reference line, wherein:
the first reference line and a third side of the second body satisfy are parallel, and the second reference line are perpendicular to the first reference line and are parallel with the first side of the first body.

4. The electronic device of claim 3, wherein:
the electronic device is configured to switch between a first mode, a second mode, a third mode, and a fourth mode by rotating the first body around at least one of the first reference line and the second reference line, wherein:
when the electronic device is in the first mode, a relative positional relationship between the first body and the second body satisfies an angle condition, and the first side of the first body is on one side of the second body;
when the electronic device is in the second mode, the relative positional relationship between the first body and the second body satisfies the angle condition, and the second side of the second body is on one side of the second body;
when the electronic device is in the third mode, the relative positional relationship between the first body and the second body satisfies an overlapping condition, and the first side of the first body faces the third side of the second body; and
when the electronic device is in the fourth mode, the relative positional relationship between the first body and the second body satisfies the overlapping condition, and the second side of the first body faces the third side of the second body, wherein:
when the electronic device is in the first mode and the fourth mode, the first display device is in a working state, and when the electronic device is in the second mode and the third mode, the second display device is in a working state.

5. The electronic device of claim 1, wherein:
the second interactive device is disposed on the third side of the second body and is close to the first edge of the third side connected to the connecting device; and
an opening for accommodating the second interactive device is formed on the second side of the first body connected to the connecting device.

6. The electronic device of claim 1, wherein:
the second interactive device includes a third display device for displaying state information of the electronic device or at least one operation control.

7. The electronic device of claim 1, wherein:
the processing module is configured to perform a control operation corresponding to the input operation.

8. The electronic device of claim 7, wherein the processing module is configured to:
determine that the second display device is in the working state based on the mode in which the electronic device is in, and adjust output parameters of the electronic device based on the input operation input to the second interactive device, the output parameters including audio output parameters of the electronic device or display parameters of the second display device.

9. The electronic device of claim 7 further comprising:
a first processing and a second processing module, the first processing module being configured to run a first operating system and execute display control of the first display device or the second display device based on the first operating system, the second processing module being configured to run a second operating system and execute display control of the first display device or the second display device based on the second operating system, wherein:
the processing module is a third processing module, the third processing module being configured to run a third operating system and execute control operations corresponding to the input operation based on the third operating system, the third operating system being the first operating system, or the third operating system being an operating system other than the first operating system and the second operating system.

10. The electronic device according to claim 1, wherein in response to the electronic device being switched from displaying on the second display to the first display device:
the second display device displaying a mode entry prompt that is used to prompt a user to select whether to enter another mode, and a selection prompt that is used to prompt the user to select an operating system corresponding to the another mode.

11. An electronic device comprising:
a first body, the first body having a first side and a second side opposite the first sides;
a second body, the second body being connected to the first body through a connecting device to change a relative position of the first body and the second body;
a first display device disposed on the first side, including a first display unit set, the display device being configured to present an image;
a second display device disposed on the second side and including a light-emitting unit and a second display unit set;
a first interactive device;
a second interactive device at least partially unblocked by the first body and the second body, wherein when a first interactive device is blocked by the first body, the second interactive device is not blocked; and
a processing module configured to:
obtain an input operation based on input from the second interactive device;
determine that the first display device is in the working state based on the mode in which the electronic device is in, and adjust output of the first display device based on the input operation input to the second interactive device; and/or
determine that the second display device is in the working state based on the mode in which the electronic device is in, and adjust output parameters of the electronic device based on the input operation input to the second interactive device, the output parameters including audio output parameters of the electronic device or display parameters of the second display device.

12. The device according to claim 11, wherein:

the display unit set is configured to present three or more colors; and the second display device has a different display principle from the first display device.

13. An electronic device comprising:

a first body, the first body having a first side and a second side opposite the first sides;

a second body, the second body being connected to the first body through a connecting device to change a relative position of the first body and the second body, the second body including a third side and a fourth side, and the first body and the second body being both plate-shaped;

a first display device disposed on the first side, including a first display unit set, the display device being configured to present an image;

a second display device disposed on the second side and including a light-emitting unit and a second display unit set, display size of the first display device and display size of the second display device meeting the same condition;

a first interactive device disposed on the third side;

a second interactive device at least partially unblocked by the first body and the second body, wherein when a first interactive device is blocked by the first body, the second interactive device is not blocked;

a processing module configured to:
    obtain an input operation based on input from the second interactive device; and
    a first processing and a second processing module, the first processing module being configured to run a first operating system and execute display control of the first display device or the second display device based on the first operating system, the second processing module being configured to run a second operating system and execute display control of the first display device or the second display device based on the second operating system, wherein:
    the processing module is a third processing module, the third processing module being configured to run a third operating system and execute control operations corresponding to the input operation based on the third operating system; wherein:
    the connecting device includes a first component and a second component, the first component connecting a first end of the first body and a second end of the second body for the first body to rotate around a first reference line, the second component connecting the first end of the first body and the second end of the second body for the first body to rotate around a second reference line, wherein:
    the first reference line and a third side of the second body satisfy are parallel, and the second reference line are perpendicular to the first reference line and are parallel with the first side of the first body.

14. The device according to claim 13, wherein:

the display unit set is configured to present three or more colors; and the second display device has a different display principle from the first display device.

* * * * *